US009831939B2

(12) United States Patent
Richardson et al.

(10) Patent No.: US 9,831,939 B2
(45) Date of Patent: Nov. 28, 2017

(54) INTERNET ACCESS VIA SATELLITE

(71) Applicant: Avanti Broadband Limited, London (GB)

(72) Inventors: Scott Richardson, Fromelles (FR); Tim Mitchell, Rochester (GB); Dennis Marquez, Minford Gardens (GB); Tulio Salvaro, London (GB); Michael Lawrence, London (GB); Lindsay Brown-Holland, East Dulwich (GB); David Williams, Grinstead (GB)

(73) Assignee: Avanti Broadband Limited, London (GB)

( * ) Notice: Subject to any disclaimer, the term of this patent is extended or adjusted under 35 U.S.C. 154(b) by 0 days.

(21) Appl. No.: 15/106,264

(22) PCT Filed: Dec. 22, 2014

(86) PCT No.: PCT/EP2014/079071
§ 371 (c)(1),
(2) Date: Jun. 17, 2016

(87) PCT Pub. No.: WO2015/092074
PCT Pub. Date: Jun. 25, 2015

(65) Prior Publication Data
US 2016/0315693 A1    Oct. 27, 2016

(30) Foreign Application Priority Data
Dec. 20, 2013    (GB) .................................. 1322744.2

(51) Int. Cl.
H04B 7/00    (2006.01)
H04B 7/185    (2006.01)
H04L 5/00    (2006.01)

(52) U.S. Cl.
CPC ....... *H04B 7/18582* (2013.01); *H04L 5/0032* (2013.01)

(58) Field of Classification Search
None
See application file for complete search history.

(56) References Cited

U.S. PATENT DOCUMENTS

RE40,540 E * 10/2008 Sainton ................. H04W 16/02
                                                              455/422.1
8,712,321 B1 * 4/2014 Dankberg .......... H04B 7/18513
                                                              370/316
(Continued)

FOREIGN PATENT DOCUMENTS

EP    1158699 A2    11/2001
EP    1950893 A1    7/2008
(Continued)

OTHER PUBLICATIONS

Combined Search and Examination Report, dated Jun. 2, 2014 from corresponding United Kingdom Application No. 1322744.2.
(Continued)

*Primary Examiner* — Mohammed Rachedine
(74) *Attorney, Agent, or Firm* — Wolf, Greenfield & Sacks, P.C.

(57) ABSTRACT

At least one satellite provides access to an internet via one or more spatial beams of the satellite, each beam covering a respective area of a geographic region and thereby providing said internet access to a plurality of respective users in the respective area. A plurality of bandwidth pools are allocated, from which bandwidth is used by the respective users in using the internet access. The sizes of two or more of these bandwidth pools are then dynamically adapted by temporarily re-allocating currently unused bandwidth from one or more of the pools to one or more others of the pools,
(Continued)

automatically in response to current demand for the internet access from at least one of the two or more pools.

20 Claims, 6 Drawing Sheets

(56) References Cited

U.S. PATENT DOCUMENTS

| | | |
|---|---|---|
| 2002/0021678 A1 | 2/2002 | Heatwole et al. |
| 2002/0178263 A1* | 11/2002 | Hreha ................... G06F 9/5083 709/225 |
| 2003/0096610 A1* | 5/2003 | Courtney ............. H04B 7/2041 455/429 |
| 2005/0037706 A1* | 2/2005 | Settle ................. H04B 7/18586 455/12.1 |
| 2006/0072581 A1 | 4/2006 | Olariu et al. |
| 2009/0285151 A1 | 11/2009 | Eidenschink et al. |

FOREIGN PATENT DOCUMENTS

| | | |
|---|---|---|
| EP | 2600553 A1 | 6/2013 |
| WO | WO 00/52849 A1 | 9/2000 |

OTHER PUBLICATIONS

International Search Report, dated Apr. 16, 2015 from corresponding International Application No. PCT/EP2014/079071.

\* cited by examiner

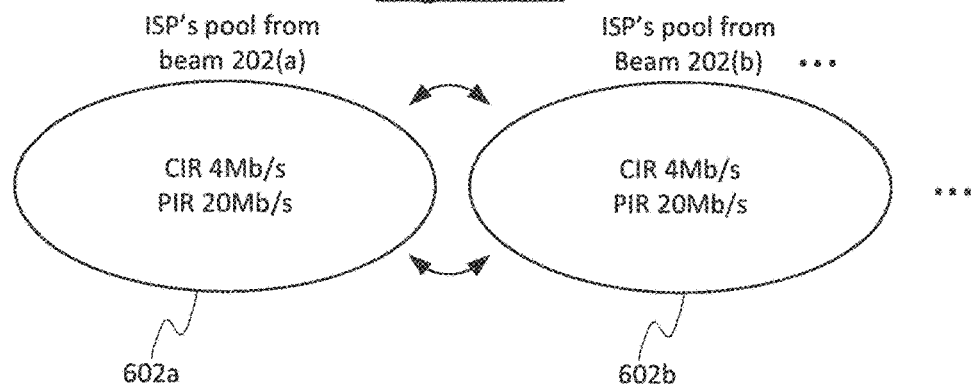
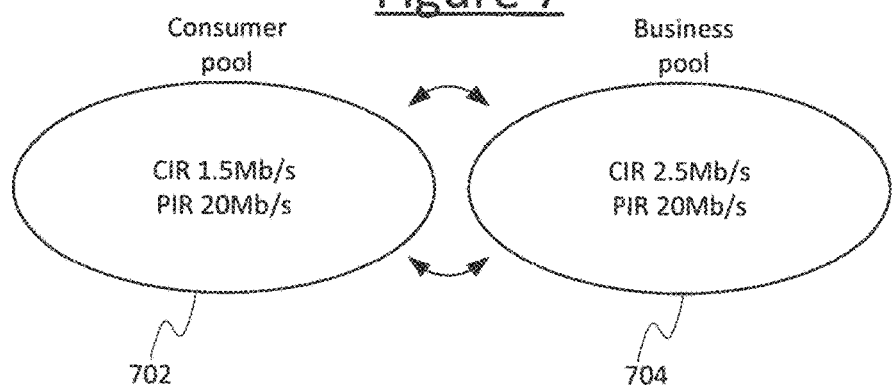
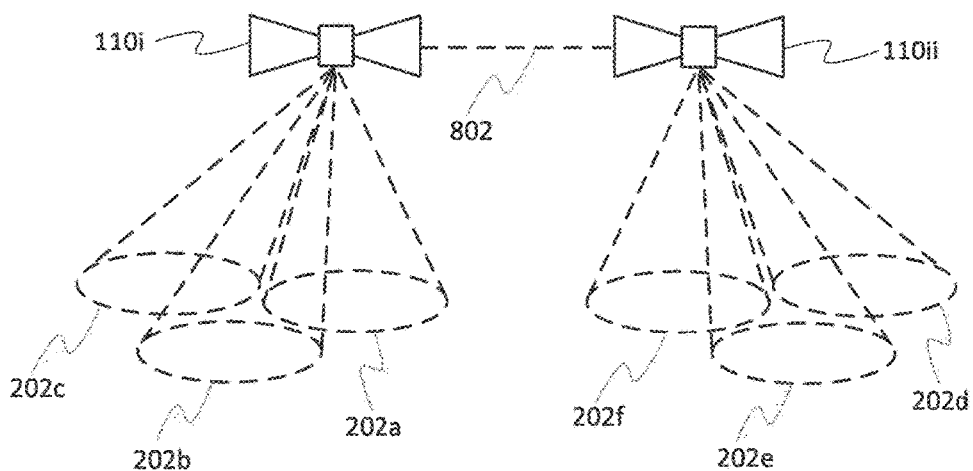

INTERNET ACCESS VIA SATELLITE

CROSS-REFERENCE TO RELATED APPLICATIONS

This application is the national phase of International Application No. PCT/EP2014/079071, filed on Dec. 22, 2014, which claims priority to United Kingdom patent application 1322744.2, filed on Dec. 20, 2013, both of which applications are hereby incorporated by reference to the maximum extent allowable by law.

TECHNICAL FIELD

The present disclosure relates to the provision of access to an internet via a satellite connection.

BACKGROUND

Some regions of the world such as rural, developing or isolated areas often have limited communication infrastructure where high speed broadband through traditional, ground-based (i.e. wired) means is not feasible. Providing an internet link via satellite enables such regions to obtain modern standards of internet access without the need to build a large amount of new infrastructure on the ground. Furthermore, satellite-based internet access can even be used as an alternative to ground-based links in regions that do have a developed communication infrastructure, or as backup to such infrastructure in case a ground-based link fails.

FIG. 1 gives a schematic overview of a system 100 for providing access to an internet 102, i.e. a wide area internetwork such as that commonly referred to as the Internet (capital I). The system 100 comprises a satellite gateway 104, a satellite 110 in orbit about the Earth, and one or more client systems 112 located in a region on the Earth's surface to which internet access is being provided. The satellite gateway 104 comprises a router 108 connected to the internet 102, and at least one satellite transceiver 106 connected to the router 108. Each of the one or more client systems also comprises a satellite transceiver 114. The satellite 110 is arranged to be able to communicate wirelessly with the transceiver 106 of the satellite gateway 104 and with the transceiver(s) 114 of the client system(s) 112, and thereby provide a link 107 for routing internet traffic between the source or destination on the internet 102 and the client system(s) 112. For example the satellite link 107 and transceivers 106, 114 may operate on the Ka microwave band (26.5 to 40 GHz).

In one model the operator of the satellite 110 and/or gateway 104 sells bandwidth to a downstream internet service provider (ISP), who in turn sells an internet access service based on that bandwidth to a plurality of end users 116. The end users 116 may be individual people (consumers) or businesses. Depending on implementation, the one or more client systems 112 may comprise a central satellite base station run by the ISP (the base station comprising the transceiver 114), and a local communication infrastructure providing access onwards to the equipment of a plurality of users within the region in question. E.g. the local communication infrastructure may comprise a relatively short range wireless technology or a local wired infrastructure, connecting onwards to home or business routers or individual user terminals. Alternatively or additionally, the client systems 112 may comprise individual, private base stations each with its own satellite transceiver 114 for connecting to the satellite 110 and local access point for connecting to one or more respective user terminals. In this case the ISP does not necessarily provide any extra infrastructure, but acts as a broker for the bandwidth provided by the satellite 110. For example an individual femtocell or picocell could be located in each home or business, each connecting to a respective one or more user terminals using a short range wireless technology, e.g. a local RF technology such as Wi-Fi.

Referring to FIG. 2 by way of example, the satellite 110 is deployed in a geostationary orbit and arranged so that its field of view or signal covers roughly a certain geographic region 200 on the Earth's surface. FIG. 2 shows South Africa as an example, but this could equally be any other country or region within any one or more countries (e.g. a state, county or province, or some other non-politically defined region).

Furthermore, referring to FIGS. 2 and 3, using modern techniques the satellite 110 may be configured as a spot-beam satellite based on a beam-forming technology, so that the communications between the satellite 110 and the client equipment 112 in the covered region 200 are divided amongst a plurality of spatially distinct beams 202. A beam refers to a volume of space or "lobe" in which transmission and/or reception of one or more given signals are approximately confined, typically a signal cone. Each beam 202 is directed in a different respective direction such that beams are arranged into a cluster, each beam covering a different respective (sub) area on the Earth's surface within the region 200 in question (though the areas covered by the beams 202 may be arranged to overlap somewhat to avoid gaps in coverage). This is a way of increasing capacity, as the limited frequency band of the satellite 110 (e.g. Ka band) can be re-used separately in different beams 202—i.e. it provides a form of directional spatial division multiplexing (though adjacent beams may still use different bands or sub-bands, especially if they overlap in space). By way of example FIG. 2 shows five beams 202a-202e which between them approximately cover the area of South Africa, but it will be appreciated that other numbers and/or sizes of beam are also possible.

SUMMARY

Operators of conventional access technologies can accommodate increasing demand for bandwidth relatively readily by upgrading the infrastructure on the ground, adding more bandwidth capacity to the infrastructure in the relevant areas when required. However, unlike other technologies, once a satellite is in orbit its capacity is more or less fixed and cannot be readily upgraded. There is therefore a desire to eke as much use as possible out of the finite bandwidth capacity of the satellite.

For instance, using spot-beam satellites at the moment, if the ISP anticipates it might need up to a certain maximum bandwidth in the area of each beam, it has to buy that maximum bandwidth for each beam even if under most circumstances it will only need a lesser amount from each beam and/or is unlikely to ever approach that maximum in all beams at once. So referring to FIG. 3 by way of example, say an ISP is trying to provide coverage of the whole of South Africa, and that this is covered by a cluster of five beams 202a-202e. If the ISP anticipates it might need up to 20 Mb/s (megabits per second) in the area covered by any one beam 202, it has to buy 20 Mb/s from each beam even if under most circumstances it will only need, say, 4 Mb/s in any one beam and/or is unlikely to ever need 20 Mb/s per beam in all beams at once. This is inefficient in that a portion of the satellite's fixed, finite capacity is being needlessly ear-marked but then left unused. It would be desirable to find a more intelligent way of distributing bandwidth.

According to one aspect disclosed herein, there is provided a method in which at least one satellite is arranged to provide access to an internet via one or more spatial beams of the satellite, each beam covering a respective area of a geographic region and thereby providing the internet access to a plurality of respective users in the respective area. The method comprises allocating a plurality of bandwidth pools from which bandwidth is used by the respective users in using this internet access, where each bandwidth pool has a size in bandwidth available for use in said internet access. The method further comprises dynamically adapting the size of two or more of said bandwidth pools, by temporarily re-allocating currently unused bandwidth from one or more of said pools to one or more others of said pools, automatically in response to current demand for the internet access from at least one of these two or more pools.

Thus advantageously, it is possible to dynamically share bandwidth so as to adapt "on the fly" to changes in current demand—that is to say, in real-time, in response to detecting actual ongoing changes in demand as and when such changes occur.

In one particularly advantageous application of this, the satellite provides the internet access via a plurality of said spatial beams of the satellite (which are spatially distinct but whose areas may overlap). In this case a respective bandwidth pool is allocated from each beam and the adaptation comprises dynamically adapting the size of the bandwidth pools of two or more of said beams, by temporarily re-allocating bandwidth from the respective pool or pools of one or more of the beams to the respective pool or pools of one or more others of the beams, automatically in response to current demand for the internet access from at least one of the two or more beams.

Referring to FIG. 4 by way of example, an ISP or other customer need only buy a bandwidth pool of 4 Mb/s in the area of each of the five beams 202a-202e, even though the demand may occasionally rise to between 4 Mb/s and 20 Mb/s in one of the areas at any one time. If this happens, say in the area covered by beam 202a, then the increased demand is detected and the additional bandwidth required may be borrowed from one or more others of the pools of beams 202b-202e, if they have bandwidth to spare.

It will be appreciated these particular figures are just illustrative. Note also that bandwidth when referred to herein may refer to uplink or downlink bandwidth, and the disclosed teachings can apply to managing either.

In embodiments, this dynamical pool sizing mechanism may alternatively or additionally be used to enable bandwidth to be dynamically shared between not just different beams, but also different service types. That is, a respective bandwidth pool is allocated to each of a plurality of service types and the adaptation comprises dynamically adapting the size of the bandwidth pools of two or more of said service types, by temporarily re-allocating bandwidth from the respective pool or pools of one or more of the service types to the respective pool or pools of one or more others of the service types, automatically in response to demand for the internet access in at least one of said two or more service types. For example, the service types may comprise a consumer service providing internet access to consumers, and a business service providing internet access to businesses. In another example, the service types may comprise a plurality of service grades.

In another possible application of the dynamic pool sizing, a plurality of satellites may provide said internet access each via a respective one or more of said spatial beams, and a respective bandwidth pool may be allocated from each satellite, the adaptation comprising dynamically adapting the size of the bandwidth pools of two or more of said satellites by temporarily and automatically re-allocating bandwidth between them in response to current demand from those satellites.

In another possible application, the internet access is provided by a plurality of satellite gateways and a respective bandwidth pool is allocated for each gateway, the adaptation comprising dynamically adapting the size of the bandwidth pools of two or more of said gateways by temporarily re-allocating bandwidth between them automatically in response to current demand on the gateways.

In yet another possible application, a respective bandwidth pool may be allocated to each of a plurality of internet service providers, and the adaptation may comprise dynamically adapting the size of the bandwidth pools of two or more of said internet service providers by temporarily re-allocating bandwidth between them automatically in response to current demand by the internet internet service providers.

In embodiments each bandwidth pool has a nominal bandwidth, to or from which, in order to adapt the size, the temporarily re-allocated bandwidth can be lent to or borrowed from the one or more other pools. The nominal bandwidth may be a committed bandwidth.

In embodiments, traffic using said temporarily re-allocated bandwidth may be marked as borrowed, and given a lower priority than traffic using the committed bandwidth. The borrowed traffic may not be guaranteed, may be first to be dropped when insufficient bandwidth is available to meet demand, and/or may have a higher probability of being dropped than traffic that is not borrowed.

In embodiments, said dynamic re-allocation may further comprise claiming back bandwidth borrowed from the one or more of said pools to the one or more others of said pools, automatically in response to current demand for said internet access from at least one of said two or more pools.

In embodiments, the nominal bandwidth of each pool may be adjusted according to a number of users using the pool and an expected bandwidth per user, the dynamic adaptation being in addition to said adjustment and being based on the current demand rather than the expected bandwidth.

In further embodiments, the method may comprise sending a report on said set of bandwidth pools to the internet service provider, the report comprising information on said re-allocation.

In yet further embodiments, the method may comprise selecting between operating at least one of the pools in two different modes: a dynamic mode in which said dynamic adaptation of the size is enabled, and a non-dynamic mode in which said dynamic adaptation of the size is disabled.

The satellite may form part of a satellite network having network layers, and the allocating and dynamically adapting steps may be implemented at an internet layer of the network layers, which is above a physical layer of the network layers.

According to another aspect disclosed herein, there may be provided gateway equipment comprising one or more satellite transceivers for communicating with at least one satellite, and one or more routers through which at least one satellite is able to provide access to an internet; wherein said internet access is provided via one or more spatial beams of the satellite, each beam covering a respective area of a geographic region and thereby providing said internet access to a plurality of respective users in the respective area; and wherein the gateway equipment further comprises: a support system for allocating a plurality of bandwidth pools from which bandwidth is used by the respective users in using said internet access, each bandwidth pool having a size in bandwidth available for use in said internet access; and a bandwidth manager configured to dynamically adapt the size of two or more of said bandwidth pools, by temporarily re-allocating currently unused bandwidth from one or more of said pools to one or more others of said pools, automatically in response to current demand for said internet access from at least one of said two or more pools.

According to another aspect disclosed herein there may be provided a system comprising: at least one satellite arranged to provide access to an internet via one or more spatial beams of the satellite, each beam covering a respective area of a geographic region and thereby providing said internet access to a plurality of respective users in the respective area; and gateway equipment arranged to communicate with at least one satellite and with the internet, and thereby facilitate the satellite to provide said internet access; wherein the gateway equipment is configured to allocate a plurality of bandwidth pools from which bandwidth is used by the respective users in using said internet access, each bandwidth pool having a size in bandwidth available for use in said internet access; and wherein the gateway equipment is further configured to dynamically adapt the size of two or more of said bandwidth pools, by temporarily re-allocating currently unused bandwidth from one or more of said pools to one or more others of said pools, automatically in response to current demand for said internet access from at least one of said two or more pools.

According to yet another aspect disclosed herein, there may be provided a computer program product for use in a system in which at least one satellite provides access to an internet via one or more spatial beams of the satellite, each beam covering a respective area of a geographic region and thereby providing said internet access to a plurality of respective users in the respective area; wherein the computer program product comprises code embodied on a computer-readable storage medium and configured so as when executed to perform operations of: allocating a plurality of bandwidth pools from which bandwidth is used by the respective users in using said internet access, each bandwidth pool having a size in bandwidth available for use in said internet access; and dynamically adapting the size of two or more of said bandwidth pools, by temporarily re-allocating currently unused bandwidth from one or more of said pools to one or more others of said pools, automatically in response to current demand for said internet access from at least one of said two or more pools.

BRIEF DESCRIPTION OF THE DRAWINGS

To assist understanding of the present disclosure and to show how embodiments may be put into effect, reference is made by way of example to the accompanying drawings in which:

FIG. 6 is a schematic representation of a scheme for sharing bandwidth between bandwidth pools, FIG. 7 is another schematic representation of a scheme for sharing bandwidth between bandwidth pools, FIG. 8 is yet another schematic representation of sharing bandwidth.

DETAILED DESCRIPTION OF PREFERRED EMBODIMENTS

Figure 1:
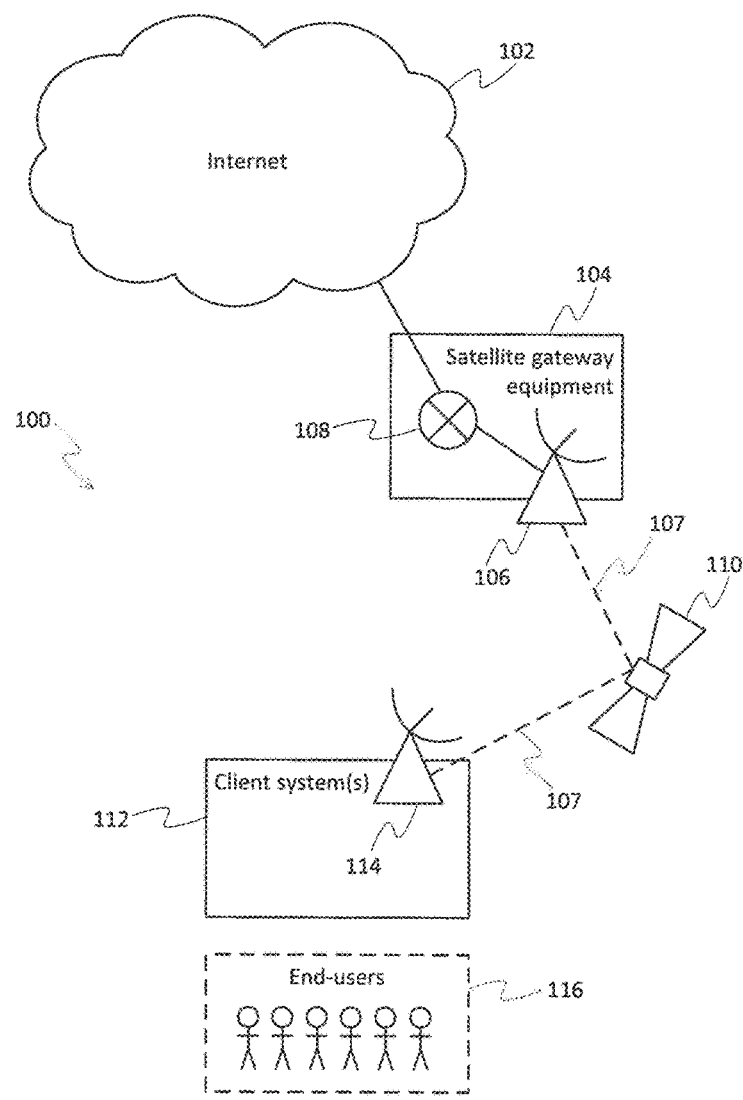
FIG. 1 is a schematic diagram of a system for providing internet access via satellite.
Figure 2:
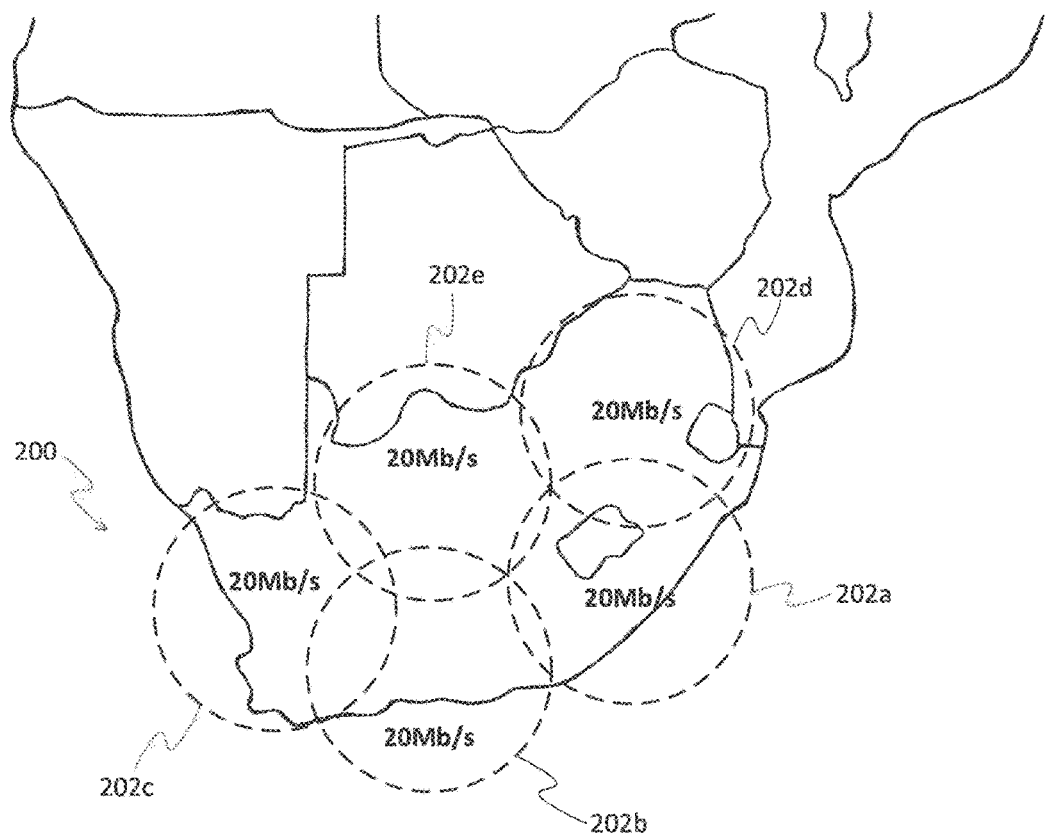
FIG. 2 is a schematic diagram showing geographic coverage of a cluster of satellite beams.
Figure 3:
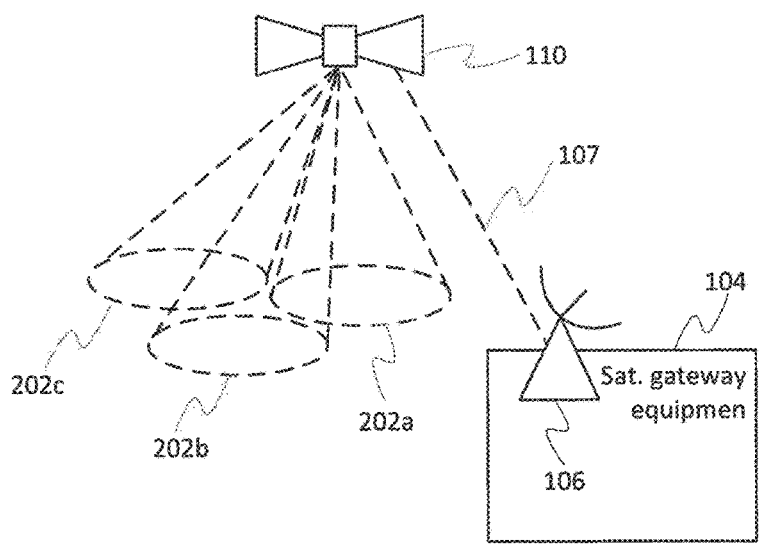
FIG. 3 is a schematic diagram of a part of a system for providing internet access via satellite beams.
Figure 4:
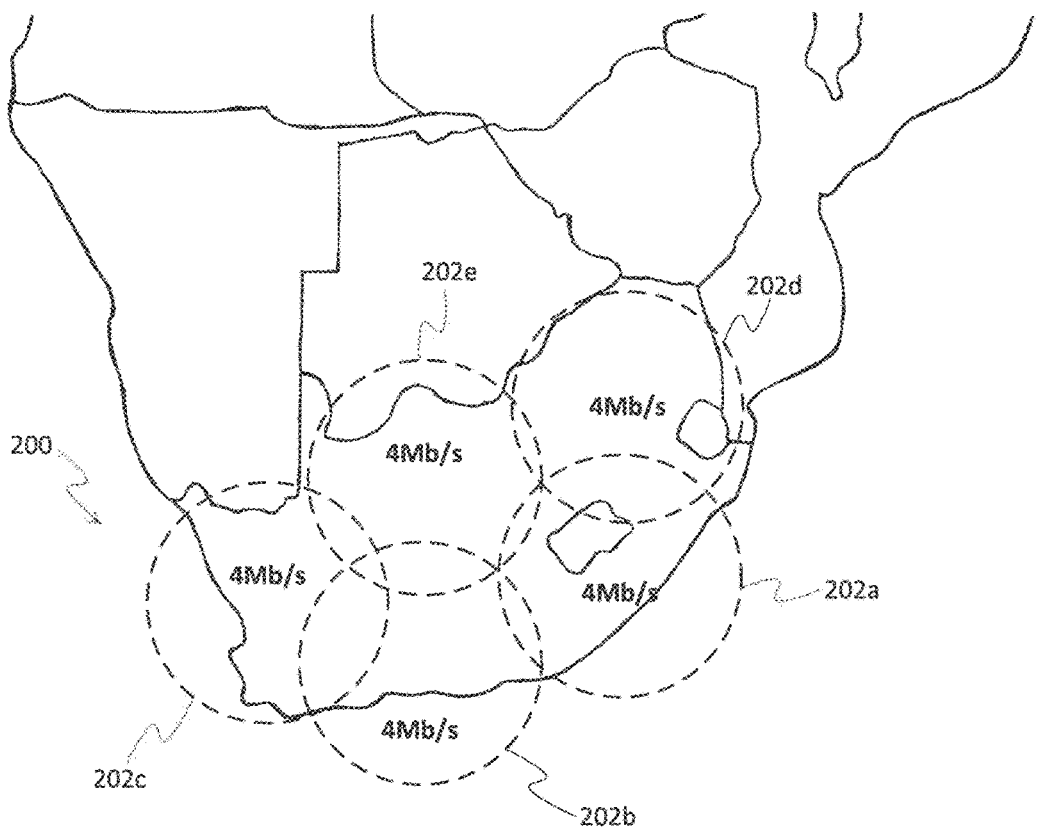
FIG. 4 is another schematic diagram showing geographic coverage of a cluster of satellite beams.
Figure 5:
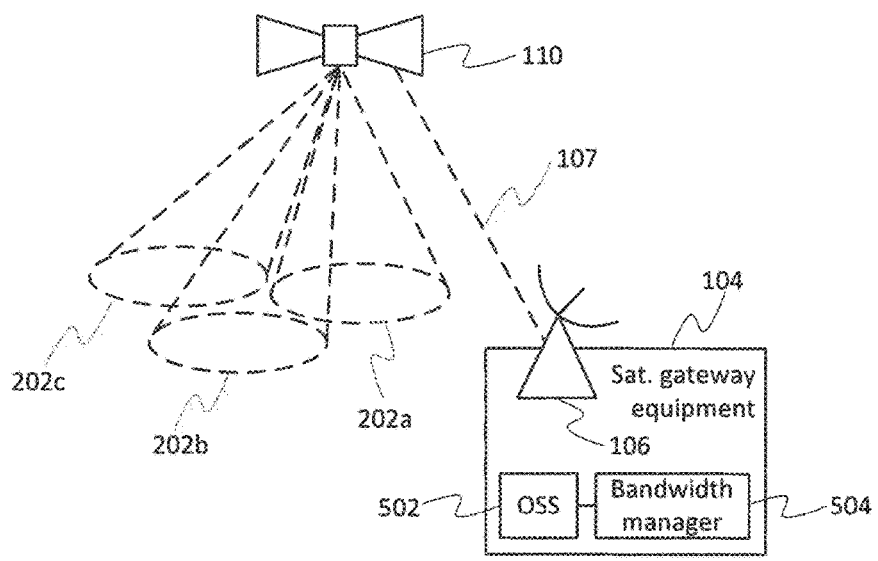
FIG. 5 is another schematic diagram of a part of a system for providing internet access via satellite beams.

FIGS. 4 and 5 show an example implementation in accordance with embodiments of the present disclosure. The elements are similar to those described in relation to FIGS. 1 to 3, except that the satellite gateway equipment 104 further comprises an operations support system (OSS) 502, and an automatic bandwidth manager 504 arranged to dynamically control the bandwidth allocated to providing internet access (uplink and/or downlink) through each of the beams 202*a*-202*e*—i.e. in real-time in response to ongoing changes in demand.

Each of the OSS 502 and bandwidth manager 504 may be implemented in the form of software stored on a storage medium or media of the satellite gateway equipment 104 and arranged to be executed on a processing apparatus comprising one or more processors of the satellite gateway equipment 104, the software being configured so as when thus executed to perform operations in accordance with any embodiments disclosed herein (though the possibility of some or all of this functionality being implemented in dedicated hardware is not absolutely excluded). Note also that the satellite gateway equipment 104 is not necessarily implemented at a single site or in a single unit (though it could be), and that in embodiments it may comprise one or more satellite gateways over one or more units at one or more sites, each gateway comprising one or more earth stations each comprising one or more satellite transceivers 106. Further, the storage and/or processing apparatus implementing the OSS 502 and/or bandwidth manager 504 could be implemented in a single unit or at a single site, or distributed across multiple units and/or sites. Also, the OSS 502 and/or bandwidth manager 504 do not necessarily have to be implemented in the same unit or in the same site as any of the one or more satellite transceivers 106 of the satellite hub 104 (though they could be), and if the gateway equipment 104 comprises multiple transceivers 106 these do not necessarily have to be implemented in the same unit or at the same site as one another (though again they could be).

As discussed, the satellite 110 is arranged to provide coverage via different spatial beams 202, each covering a different respective area on the Earth's surface. The bandwidth manager 504 is arranged to allocate a bandwidth pool from each beam 202 to each of one or more ISPs purchasing bandwidth from the satellite operator. Each pool has a certain nominal bandwidth allocated to it, e.g. a default and/or minimum committed bandwidth, but can also dynamically borrow or lend bandwidth allocation to or from the pools of other beams 202, as will be discussed in more detail shortly.

In embodiments the bandwidth manager 504 may also be configured to provide different service types, and to allocate a separate bandwidth pool to each service type. For example the service types may comprise a consumer service having a bandwidth pool allocated for consumers supplied by the ISP in question, and a business service having a separate bandwidth pool allocated for businesses supplied by the ISP. In another example, the service types may alternatively or additionally comprise different service grades having different performance or quality of service, e.g. a gold service, silver service and bronze service each allocated a separate bandwidth pool. Again each pool has a certain nominal bandwidth allocated to it, e.g. a default and/or committed bandwidth, but can also dynamically borrow or lend bandwidth to or from the pools of other service types.

The OSS 502 provides a front-end by which an ISP (being a partner of the satellite operator) can configure the bandwidth pools and associated rules they wish to apply in a high-level (human-understandable) form, e.g. to choose which pools to purchase at what levels (beam, service type, etc.), the size of each pool, and whether bandwidth sharing is enabled for each pool (and any associated conditions or restrictions). The OSS 502 is arranged to convert such information into a low-level (machine-readable) form and supply it in this form to the bandwidth manager 504, where it is used to configure the behaviour of the bandwidth manager 504. This includes supplying the bandwidth manager 504 with a list specifying metadata it should watch for in the traffic sent back and/or forth over the satellite link 107 between the client systems 112 and internet 102.

Based on this, the bandwidth manager 504 is configured to automatically monitor the ongoing traffic over the link 107 and extract the specified metadata from said traffic. For example the metadata may comprise information about the total current amount of traffic, which client system 112 and/or user 116 the traffic originates from (uplink) or is destined to (downlink), the current amount of traffic being transmitted to and/or from each client system 112 and/or user 116, and/or information indicative of which beam 202 or corresponding area the users fall within. In embodiments the metadata may also indicate the service type, e.g. consumer or business service; and/or the service grade (e.g. gold, silver or bronze).

The nominal size of the pools themselves are dimensioned based on a number of users supplied by each pool and the expected bandwidth per user, e.g. average bandwidth per user, or equivalently the contention ratio being a ratio of the bandwidth of the pool in question to the expected bandwidth per user. For example the pool size may be set as the number of users in the pool multiplied by the expected (e.g. average) bandwidth per user. In embodiments the nominal pool size is the committed bandwidth of the pool, and may be set in this manner. The nominal (e.g. committed) pool size may be adjusted on a pseudostatic basis based on the number of users supplied by the pool, e.g. the number of users using a given beam or a given service type.

The bandwidth manager 504 is arranged to automatically extract the specified metadata relating to recent, ongoing traffic and/or relating to current requests to send traffic, and based thereon to automatically determine the current demand for bandwidth in the different beams 202 and/or service types. That is to say, it determines the actual instantaneous demand on the bandwidth (which may be based on the actual recent traffic just sent and/or actual current requests for usage from users or client systems). Note this is distinct from the expected (e.g. average) bandwidth per user used to dimension the nominal (e.g. committed) pool size, as the expected bandwidth per user does not measure the actual current demand. For example expected average bandwidth does not react to peak demand. Note also that the nominal (e.g. committed) pool size in terms of the number of users multiplied by the expected bandwidth per user does not react to changes in current demand from a given number of users. Further, note that the number of users according to which the committed bandwidth of the pool is sized does not take into account whether and how active the users are—an inactive user may be subscribed to the pool and therefore adding to its committed size, but that user may not actually currently be active in consuming any of the bandwidth of that pool, or at least may not be consuming the expected bandwidth per user.

The bandwidth manager 504 is configured to automatically apply a dynamic pool sizing based on the current demand. That is, if one or more first pools are currently experiencing a demand for bandwidth that is higher than their notional size (e.g. their committed bandwidths) while one or more other, second pools are experiencing a demand that is lower than their notional size (e.g. again their committed bandwidths) such that bandwidth from that pool is currently going unused, then in response to detecting such current conditions the bandwidth manager 504 will temporarily re-allocate a "burst" of bandwidth from one or more of the first pools to one or more of the second pools. This is performed automatically and dynamically, i.e. "on the fly" in response to detecting changing demand in the actual current traffic.

Examples of the dynamic pool sizing applied by the bandwidth manager 504 are discussed in more detail with reference to FIGS. 6-8.

FIG. 6 illustrates an example of different respective bandwidth pools being allocated from each of the different beams 202 in a cluster covering a geographic region 200. E.g. for five beams 202a-202e, there are five respective pools 602a-602e. Such pools 602 may be purchased from the satellite provider by multiple ISPs, with each beam 202 being able to supply the needs of multiple ISPs. Thus it is envisaged that a given pool 602 allocated from a given beam 202 is only a relatively small portion of the beam's bandwidth capacity. For example one ISP buys a set of pools comprising a pool from each beam 202a-202e, and another ISP buys another set of pools comprising a pool from each beam 202a-202e. Alternatively or additionally, an ISP could buy a selection of one or more pools from one or more respective selected beams. From the purchased bandwidth, each ISP then supplies a respective plurality of users 116 in the respective area covered by each beam 202.

The respective pool 602 of each beam 202 is allocated a certain nominal bandwidth which in embodiments is a committed bandwidth, i.e. a minimum bandwidth to be shared between all the users supplied from that pool 602 (i.e. all the users supplied by a particular ISP in a particular area covered by a particular beam 202). This may be referred to as the committed information rate (CIR). The service sold to the ISP is guaranteed never to fall below the CIR if that bandwidth is currently in demand in the respective area in question (except perhaps under extraordinary circumstances such as a fault or force majeure). In embodiments the size of each pool in terms of its CIR is set pseudostatically based on the number of users served by the pool and the expected (e.g. average) bandwidth per user in that pool.

However, if that bandwidth is not currently in demand in the respective area (i.e. from the users of the respective beam of the respective pool), the bandwidth manager 504 allows some or all of this unused bandwidth to be automatically and dynamically lent to the respective pool or pools 602 of one or more other beams 202 where demand from the users may be currently exceeding the respective CIR. This allows the peak bandwidth to rise above the notional rate allocated to a given pool at a given time for a given ISP and a given number of users 116. The peak bandwidth may be referred to as the peak information rate (PIR). Thus if there are N beams in the cluster from which a respective pool with CIR of C Mb/s is purchased by a given ISP from each, then the theoretical PR that may be achieved for a given ISP in a given pool at any one time is NC.

For instance in the example of FIG. 6, the ISP buys a pool with CIR of 4 Mb/s in each of five beams 202a-202e respectively, but anticipates that it could be required to supply up to 20 Mb/s locally at any one time. For example, say all the users served by a given beam 202a might suddenly want to stream video at the same time, or some inactive users served by the pool become active. The bandwidth manager 504 operates such that bandwidth can be dynamically shared between two or more of the respective pools 602a-602e (potentially any combination of borrowing and lending between and combination of pools) based on current demand from the respective users 116 in the respective areas. Hence a theoretical maximum of 20 Mb/s is possible if all the demand falls under a single beam 202.

Figure 10:
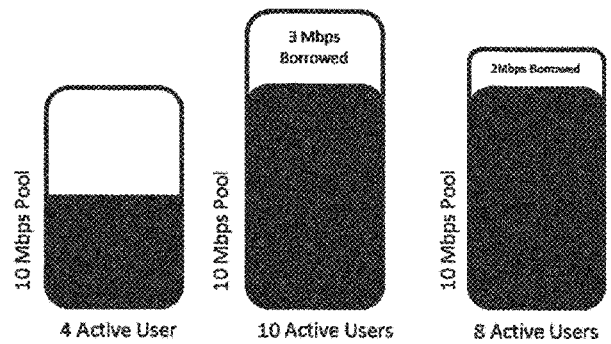
FIG. 10 is a schematic representation of a plurality of pools.

As another example see FIG. 10. Here, each pool serves the same number of users and so is allocated the same basic size in terms of CIR. However, different numbers of the users served by the different pools may be active at any given time, thus creating different instantaneous demands on the different pools (and/or the users of the different pools may have different individual bandwidth demands, e.g. more users of one pool are streaming video while more users of another pool are just browsing the web). Hence in this example, 5 Mb/s is borrowed from a first pool where demand is below the CIR (e.g. a pool of a first beam 202a) and split between the two other pools where demand is above the CIR (e.g. the respective pools of two other beams 202b and 202c). Thus in the example shown, the second pool has its size temporarily increased to 13 Mb/s and the third pool has its size temporarily increased to 12 Mb/s.

When demand shifts again, the bandwidth manager 504 acts to dynamically reclaim borrowed bandwidth for the pool or pools it was borrowed from.

Note that the actual bandwidth capacity of each beam 202 is generally fixed (or at least static over the period the described adaptation occurs—in embodiments the operator may be able to make occasional adjustments to the beams' capacities manually in a non adaptive fashion). Hence when bandwidth is described herein as being lent and borrowed between the pools of the different beams 202, or the like, this does not mean the actual bandwidth of the beams 202 changes. Rather, the portion of bandwidth allocated for a given ISP from one beam is reduced while the proportion of bandwidth allocated for that same ISP in another beam is increased by a corresponding amount. This has the advantageous technical effect that bandwidth is not needlessly reserved in beams 202 when it is currently going unused, thus increasing the potential to use more or all of the full bandwidth potential of the satellite 110.

In embodiments, any traffic that is temporarily re-allocated from one pool 600 to another (as opposed to traffic sent using the CIR portion of a pool's bandwidth) is marked by the bandwidth manager 504 with metadata indicating that it is borrowed traffic, i.e. traffic sent using borrowed bandwidth. For example, current protocols allow traffic to be marked with a traffic type such as video, voice or web-browser traffic (for the purpose of treating different types of traffic differently in accordance with their specific needs and/or priority, e.g. voice or video are more sensitive to jitter than web browser traffic). In embodiments, this field may be overwritten with a new traffic type "borrowed".

Any traffic that is marked as borrowed is given a lower priority than other that is sent using the committed allocation. In embodiments this means the borrowed traffic is not guaranteed, i.e. can be dropped. In embodiments the borrowed traffic is the first to be dropped if demand suddenly takes an unexpected turn meaning that all current demands including the borrowed bandwidth can no longer be granted, or at least has a higher probability of being dropped. For example, this may occur if all or a significant proportion of the ISPs subscribing to a particular beam demand close to their PIR at once, such that demand from that beam exceeds its capacity. As another example, demand could exceed capacity due to a temporary bottleneck somewhere in the system, such as in some part of the gateway equipment 104. In such situations, then the traffic marked as borrowed may be unequivocally dropped in favour of the traffic from the committed part of the pool, or may have a higher probability of being dropped. This functionality may be implemented by the bandwidth manager 504, or by a separate traffic scheduler component elsewhere in the network which is configured to recognise and act upon the new traffic type.

In optional embodiments, having implemented the bandwidth manager for the purpose of sharing bandwidth between beams, the existence of this same mechanism can advantageously be exploited to apply dynamic bandwidth sizing between pools not just of different beams, but also different service types.

This is discussed in relation to FIG. 7. Here for example, there are two different service types for different types of end-user: a consumer pool 702 from which the ISP in question supplies consumers and a business pool 704 from which that ISP supplies businesses. Another example would be different service grades, e.g. respective pools for gold, silver and bronze graded services provided by a given ISP, but for the sake of illustration the embodiment of FIG. 7 is described in relation to the consumer and business services and their respective 702, 704.

In such embodiments, the ISP buys a pool 704 having a certain nominal (e.g. committed) bandwidth from each of one or more beams 202 for its business service, and another pool 702 having a certain nominal (e.g. committed) bandwidth for its consumer service. Again, these pool sizes may be set pseudostatically based on the number of users in each pool and the average bandwidth per user. If the demand from a given number of users in one such pool 702, then falls below the nominal level while demand in the other 704 rises above, the bandwidth manager 504 can automatically detect this and dynamically re-allocate a temporary burst of bandwidth and, just like in the case of sharing between the pools 602 of different beams 202. E.g. in the example shown in FIG. 6, from a given beam 202 the ISP has a CIR of 2.5 Mb/s allocated to its business service and a CIR of 1.5 Mb/s allocated to the consumer service (totalling the 4 Mb/s CIR the ISP bought from the beam in question). However if demand from the business users rises while demand from the consumers falls, or vice versa, then one of the services may be temporarily allowed up to a PIR of 4 Mb/s at any one time.

In embodiments, the mechanism described above regarding the marking of borrowed traffic may also be applied to the pools of different service types. That is, traffic borrowed from another service type's pool may be marked as such and given a lower priority than traffic sent using the CIR allocation of the service type pools, e.g. it is not guaranteed and may be first to be dropped or have a higher probability of being dropped.

In further embodiments, the dynamic pool sizing mechanism may be used to dynamically share bandwidth between the pools of different ISPs. So if ISPs X and Y both lease bandwidth from a certain beam or beams and have a contract between one another (and/or a suitable contract with the satellite operator agreeing to such an arrangement), then X can dynamically borrow currently unused bandwidth from a pool of Y and vice versa. For example, say ISP X buys a pool from a beam 202a but is currently unable to meet its users' demand in that beam using the pool from that beam (and perhaps not even by borrowing bandwidth from the pools of any other beams 202b, 202c that X may have bought). If at the same time Y has an underused pool from the beam 202a or indeed another beam 202b, 202c, then bandwidth from one or more of Y's pools may be dynamically lent to X (and potentially Y is remunerated from this or simply benefits from a reciprocal arrangement on other occasions).

In yet further embodiments, the dynamic pool sizing mechanism may be used for sharing bandwidth between different satellites 110 and/or different gateways 104.

FIG. 8 shows a system in which internet access is provided not just via one satellite, but via two or indeed more satellites 110i, 110ii each providing one or more beams 202. For instance in embodiments there may comprise a fleet of three satellites. The satellites 110i, 110ii may be configured to communicate with one another in orbit via an inter-satellite link 802, e.g. a laser link. Alternatively or additionally the gateway equipment 104 on the ground may manage both satellites together with visibility of information from multiple earth stations of that equipment 104. The multiple satellites 110 may thus form a synergistic communication system for providing internet access. Combining this with the bandwidth manager 504, an ISP leasing a bandwidth pool from a beam of one satellite 110i may now dynamically borrow from the bandwidth pool from one or more beams of another satellite 110ii (pools leased by that ISP or another ISP). Note again this does not mean the capacity of the satellites 110 changes, but rather the pools of bandwidth allocated to one or more ISPs are adapted such that bandwidth currently going unused in a pool from one satellite need not be needlessly reserved.

A similar idea may be extended to sharing between different gateways 104—if different beams or groups of the beams 202 are served by different respective gateways 104 then an ISP leasing a bandwidth pool served by one gateway 104A may now dynamically borrow from the bandwidth pool or pools served by another gateway 104B (leased by that ISP or another ISP).

Again, in embodiments the above mechanism of marking of borrowed traffic may also be applied to any of these various kinds of pools—i.e. traffic marked borrowed is given a lower priority, e.g. it is not guaranteed and may be first to be dropped or have a higher probability of being dropped.

Figure 9:
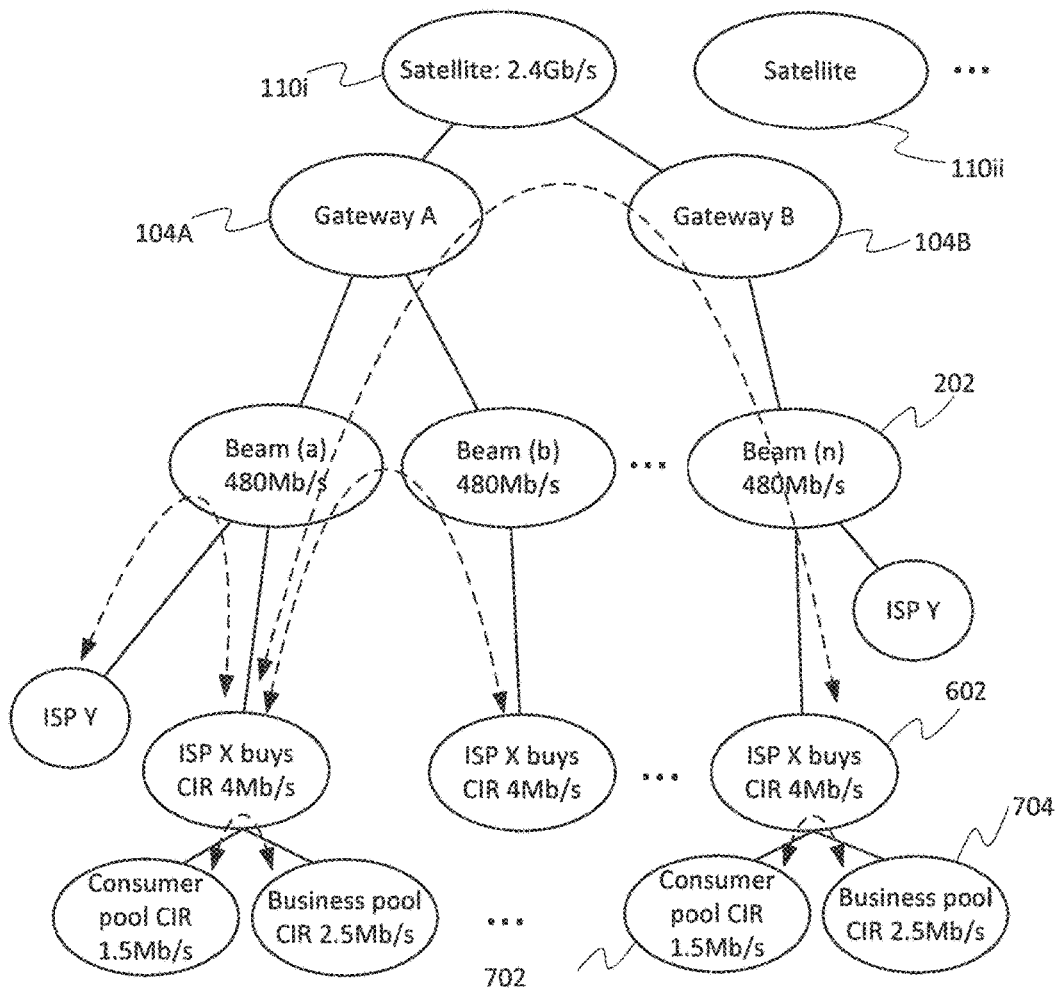
FIG. 9 is a schematic representation of a hierarchy of bandwidth pools.

As shown in FIG. 9, in embodiments there is a hierarchy to the different kinds of pools. At the top of the hierarchy is the bandwidth capacity of a given satellite 110 itself, which can never be exceeded in total (and cannot be readily upgraded once the satellite is in orbit). This total capacity is made up of the individual contributions of the capacities of the different spatially division multiplexed beams 202. For instance in the example shown in FIG. 9, the satellite has five beams 202a-202e each with a capacity of 480 Mb/s. As the beams 202 are spatially distinct, the capacity is duplicated in each respective area, giving a total bandwidth of 5×480 Mb/s=2.4 Gb/s in the example shown.

Each beam or group of beams is served by a respective gateway 104A, 104B of the gateway equipment 104 on the ground. Note that the gateway or gateways 104 are connected between the satellite(s) 110 and internet 102 (see FIG. 1), not between the satellite 110 and the client systems(s) 112—FIG. 9 is a schematic representation of the hierarchy of pools, not the connections between network elements.

Within each beam 202, the portions of the capacity of that beam may be bought by different ISPs. In the example of FIG. 9, a particular ISP "X" buys a respective pool 602 from each beam 602, each with CIR 4 Mb/s (though in general it could buy different CIR pools from different beams). Other ISPs may also buy various pools from the various beams. Then, from the pool 602 of a given beam 202, a given ISP has a portion of that pool's CIR allocated to its business service pool 704 and another portion of that pool allocated to its consumer pool 702.

In embodiments a hierarchical order in which bandwidth may be attempted to be dynamically re-allocated between the different levels of pool may also be implemented as follows. At the lowest hierarchical level, if within a given beam, say 202a, ISP X needs to provide its business users with more bandwidth, then the bandwidth manager 504 first determines whether this can be satisfied by temporarily borrowing bandwidth for the business pool from the consumer pool (or vice versa) and if so does so. Generally this can be extended to re-allocating between any different service types, e.g. different service grades. If demand cannot be satisfied by re-allocating between the pools of different service types however, the bandwidth manager 504 reverts to the next hierarchical level up in order to determine whether it can borrow from another ISP, e.g. "Y", in the same beam 202a, and if so uses this option. If not, the bandwidth manager 504 reverts to the next highest hierarchical levels in turn: to determine whether it can borrow from one of X's own pools from another beam 202b, 202c served by the same gateway 104A; and then if not, whether it can borrow from a pool of another ISP served by the same gateway 104A. If these options are not possible, the bandwidth manager 504 reverts to the next highest levels again where it determines whether it can borrow from another of X's pools served by a different gateway 104B but the same satellite 110i, then if not whether it can borrow from a pool of another ISP served by a different gateway 104B but the same satellite 110i; and if these are still not possible, the bandwidth manager 504 determines whether it can borrow from a pool of the same ISP X from a different satellite 110ii, finally reverting to borrowing from a different ISP (e.g. Y) from a different satellite 110ii.

At each stage up the hierarchy the bandwidth manager 504 implements the first possible option it encounters rather than reverting further up the hierarchy. That is to say, the bandwidth manager 504 will always choose the lowest cost transaction (e.g. it is less complex or disruptive to borrow between beams served by the gateway than served by different gateways, and to borrow between beams of the same satellite than between different satellites). Note that in some cases the bandwidth borrowed from one level of pool may only meet a portion of what is required. In this case the bandwidth manager 504 may use what it can from this level, then revert one or more levels further up the hierarchy in turn in order to meet the rest of the requirement. Note also that in embodiments, the option of borrowing from another ISP may take a different place in the hierarchy, e.g. such that the bandwidth manager 504 first tries to borrow from a pool of the same ISP X all the way up to borrowing from a different satellite 110*ii* before reverting to trying to borrow from another ISP.

Note that in embodiments, where it is said that bandwidth is shared or borrowed between pools or the like, this does not mean bandwidth is directly borrowed between pools on the same level within the hierarchy. Rather, a pool with underused resources releases bandwidth to its parent pool to be available to be lent down the hierarchy again, and a child pool requesting an extra bandwidth allowance then borrows from the parent pool. For instance if the pool for beam A is 100 Mbps and has two child pools of ISP X at 50 Mbps and ISP Y at 50 Mbps, then any unused capacity by ISP X will be available from the parent pool of beam A to be borrowed by ISP Y. E.g. if ISP X is consuming 20 Mbps then ISP Y can borrow up to 30 Mbps from its parent pool, that of beam A, given that the parent pool A has 20 Mbps utilised by child pool ISP X and 50 Mbps utilised by child pool ISP Y. Borrow occurs iteratively in such a manner up the hierarchy.

As an additional feature to any of those described above, in embodiments the bandwidth manager 504 may be configured to provide visibility of bandwidth utilisation and bandwidth sharing to the ISPs it is serving, by sending a report of current and/or past bandwidth allocations potentially including a report of the dynamic variations. The report may be transmitted to equipment of the ISP over a suitable communication channel. For example it may be made available for the ISP to retrieve online, or may be sent periodically. This allows ISPs to monitor bandwidth utilisation, and may also give them the ability to forecast bandwidth requirements and increase as required.

As another possible additional feature, in embodiments the bandwidth manager 504 may be configured to allow one, some or all of the pools to have the option of operating in two different modes: a dynamic mode in which the dynamic bandwidth sharing is enabled, and a non-dynamic mode in which the dynamic bandwidth sharing is disabled. In this case the bandwidth manager 504 will only dynamically re-allocate bandwidth between pools that are enabled into the dynamic mode and are therefore participating in the dynamic bandwidth sharing scheme. For example the mode may be an option which can be selected by the respective internet service provider.

The gateway equipment 104, satellite 110 and client system(s) 112 constitute a satellite network, which is also an internet. The satellite network may comprise additional satellite(s) (e.g. 110*i* and 110*ii* shown in FIG. 8).

In one embodiment, the bandwidth manager 504 and, where applicable, any separate traffic scheduler component operate at an internet layer (e.g. IP layer) of network layers of the satellite network. "IP" stands for "Internet Protocol". The network layers include a physical layer, below the internet layer so that the bandwidth manager 504 (and traffic manager component) operate above the physical layer.

Figure 11:
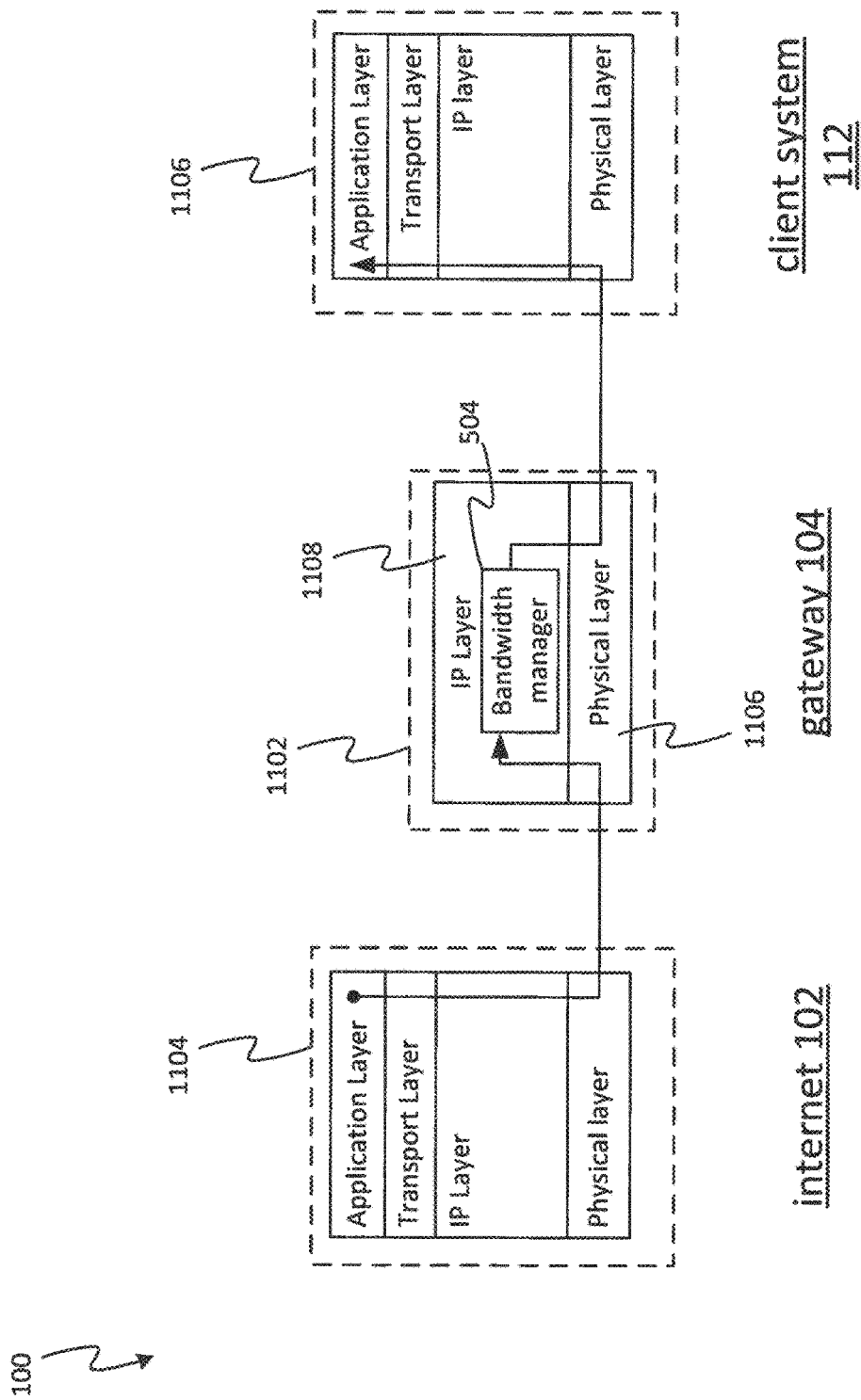
FIG. 11 is a schematic illustration showing a bandwidth manager operating at an internet layer of network layers.

FIG. 11 shows a protocol stack 1102 implemented by the satellite gateway equipment 104, which comprises at least the following network layers: a physical layer 1106 and IP layer 1108. FIG. 11 also shows corresponding protocols stacks implemented by endpoints such as a server of the internet 102 (stack 1104) and a client system 112 (stack 1106). Each of the endpoint protocol stacks 1102, 1104 also includes physical and IP layers, and additionally comprise a respective transport layer (above the IP layer) and application layer (above the transport layer).

As known to the person skilled in the art, the application and transport layers provide process-to-process connectivity and end-to-end connectivity respectively between the server and client.

The IP layers provide internet communications in the form of IP datagrams, having IP headers and IP payloads. Note, herein the terms IP packet and IP datagram are used interchangeably, and do not carry any implications as to the (un)reliability of any protocol according to which they are transmitted. In particular, the IP layers provide IP packet routing, i.e. communication between different individual networks of the internet 102 and satellite network, using information in the IP packet headers.

The physical layer includes the physical link mechanism(s) by which data is transmitted and received to/from and through the satellite network, such as modulation/demodulation onto physical channel(s), controlling the manner in which symbols are represented on underlying physical media, multiplexing of data onto physical channels etc.

Application data generated at the application layer of the server is passed down to the transport layer of the stack 1104, and from there to the IP layer where it is encapsulated in IP datagram payloads; the IP datagrams also include IP headers. The IP datagrams are passed to the server physical layer, from which they are transmitted the gateway 104 and received at the physical layer 1106 of the gateway 104. The received IP datagrams are passed up from the physical layer 1106 to the IP layer 1108, and in particular to the bandwidth manager 504 operating at the IP layer 1108. The IP datagrams are then passed down from the bandwidth manager 504 to the physical layer 1106 of the gateway 104, and from there transmitted to the client system 112 via the satellite link 107. At the client system, the IP datagrams are passed up from the client-side physical layer to the client side IP layer, from which their IP payload data (which includes the application data) is passed up to higher layers.

The bandwidth pooling and dynamic (re)allocation is implemented at the IP layer. For instance, a respective IP traffic limit may be set for each pool which defines that pool's size in relation to traffic at the IP layer e.g. a maximum permitted number of IP packets per unit time, or a respective maximum amount of IP layer traffic per unit time (e.g. in bits per second, or similar). An allocation can then be enforced when necessary (e.g. because it is not currently possible to borrow bandwidth from any another pool) at the IP layer by the bandwidth manager 504/traffic scheduler component e.g. selectively dropping or delaying (e.g. buffering) IP datagrams so that the IP traffic limit is not exceeded.

For example, where a pool has been allocated to an ISP, if the total number of IP packets/amount of IP-layer traffic—arriving at the bandwidth manager 504 from the internet 102 and intended for customers of that ISP—per unit time exceeds the IP traffic limit, the bandwidth manager 504 can first check to see it can borrow bandwidth from another pool for the additional IP datagrams in the manner described above. If borrowing is not possible (i.e. there is currently no bandwidth available that can be reallocated from another pool), the bandwidth manager can enforce the limit by dropping or delaying the additional IP packets. Or if it is possible to borrow some bandwidth from another pool(s) but not enough to accommodate all the additional IP packets, the bandwidth manager can temporarily reallocate that bandwidth to the pool in question, thereby increasing the IP traffic limit for the pool in question, to accommodate as many of the additional IP packets as possible and drop or delay the rest of the remaining IP packets as needed to enforce the increased IP traffic limit.

In embodiments, bandwidth manager 504 also selectively modifies the IP packet headers to mark certain packets as using borrowed bandwidth (see above). As mentioned above, current protocols allow traffic to be marked with a traffic type. For instance, the Internet Protocol (IP) defines a Type-Of-Service (TOS) field, which is included in the header of an IP packet. In embodiments, it is the traffic type field, defined by an internet layer protocol (e.g. the IP protocol), in the header of an internet layer packet (e.g. IP packet) which is overwritten at the internet layer with the "borrowed" traffic type. The bandwidth manager or (where applicable) the separate traffic scheduler component can then simply drop IP datagrams marked as borrowed as soon the borrowed bandwidth (or at least some of it) becomes unavailable because of increasing demands for bandwidth from the pool from which it was borrowed. This means that the bandwidth manager/scheduler component can respond quickly to changing demands.

Note that this is just an example, and there are other ways in which traffic can be marked as borrowed e.g. VLAN (Virtual Local Area Network)-tagging, MPLS (MultiProtocol Label Switching) labelling, and custom proprietary HTTP (HyperText Transfer Protocol) headers could also be used to this end.

When operating at the internet layer in this manner, the bandwidth manager need not concern itself with any of the implications of dropping IP packets: it can simply rely on the fact that higher-layer end-to-end protocols will either have their own packet retransmission mechanisms if they are reliable protocols, such as TCP ("Transmission Control Protocol"), or will "expect" some packet loss to occur in any event if they are unreliable protocols, such as UDP (User Datagram Protocol). TCP and UDP are transport layer protocols.

Note, although not shown in FIG. 11, the gateway protocol stack 1102 may comprise additional layers between the IP and physical layer. For instance, on the internet-facing side, a link layer may be implemented between the physical and IP layer. Moreover, although drawn as symmetric, the stack 102 may asymmetric in the sense that the layer structure on the client facing side may be different from the internet facing side—e.g. on the client facing side the stack may be structured according to proprietary "IP-over-satellite" protocol(s). Moreover, although shown as a single stack, the stack 1108 may be implemented across multiple devices—e.g. across one or more devices of a core network on the internet facing side, and one or more satellite hubs— possibly of different vendors implementing different, proprietary IP-over-satellite mechanisms—on the client facing side.

Advantageously, when the bandwidth manager 504 operates at the IP layer in this manner, it is agnostic to the details of the lower layer(s) beneath it, and to the architecture/topology of the satellite network. For example, when operating at the IP layer, the bandwidth manager remains vendor agnostic, in the sense that it can operate, without adaptation, on IP traffic that is being routed via different satellite hubs from different vendors, each implementing their own proprietary lower-layer technologies in a manner that is invisible to the bandwidth manager 504. Among other things, this means that the bandwidth manager can readily adapt to the installation of new vendor technology in the hub equipment without substantive modification. Operating at the IP layer also means the bandwidth manager 504 can respond quickly to changes in bandwidth conditions (e.g. by dropping IP packets) as no changes are required to the configuration of the underlying physical technology.

A similar scheme could be implemented for traffic travelling in the other direction (from the client system 112 to the internet 102) by selectively dropping or delaying IP packets before they are transmitted to the gateway 102 via the satellite link 107, if bandwidth cannot be borrowed from elsewhere.

It will be appreciated that the above embodiments have been described only by way of example.

For instance, while the above has been described in terms of a spot beam satellite, the dynamic pool sizing mechanism disclosed herein may more generally be applied to dynamically share bandwidth allocation between pools of one or more beams of one or more satellites; e.g. to share between bandwidth pools allocated from different beams or satellites, to share between pools allocated from beams or satellites served by different gateways, or to share between the pools allocated to different service types, internet service providers or any other service divisions, or any combination of these possibilities.

Further, the satellite is not limited to being placed in a geostationary orbit. In other embodiments for example, the internet access could be provided to a given region by means of one or more constellations of low earth orbit or medium earth orbit satellites, where a constellation is a group of satellites in a non-geostationary orbit but which between them are sufficient in number (given their altitude) to provide constant coverage of the region in question in normal conditions. Furthermore, where a satellite is referred to as having one or more beams, this does not necessarily limit to any specific beam-forming technique. Typically beams are formed using an antenna array based on phase or time differences between the signals transmitted or received by the different antennas of the array. However, other techniques could be possible such as physically restricting an opening angle of a satellite's transmitter or receiver using a material opaque to microwaves, or by equipping the satellite's transmitter or receiver with a shaped reflector.

Note also that the terms internet service provider or ISP as used herein do not necessarily limit to an entity providing directly to end-users (though that is certainly one type or internet service provider), and it will be appreciated that there may be multiple tiers of internet service provider where higher (upstream) tiers of ISP provide service to one or more lower (downstream) tiers of ISP (indeed the satellite operator themselves may be considered a higher tier of ISP). Generally the internet service provider may refer to any partner of the satellite operator who acts at any level between the satellite provider and any other downstream entity, whether an end user, business, or other lower-tier ISP, and whether by means of intermediate network equipment of the internet service provider in question or by acting a as broker between the satellite provider and downstream entity. Further, note that where it is referred to a satellite operator, this does not necessarily limit to, say, the entity that designed, built or launched the satellite or who is performing any particular task of maintaining or controlling the satellite (though again those are certainly possibilities), but could more generally refer to any entity responsible for ultimately providing the bandwidth from the satellite(s) in any technical and/or managerial sense.

Other implementations or applications of the above techniques may become apparent to the skilled reader given the disclosure herein. The scope of the disclosure is not limited by the described examples, but only by the accompanying claims.

The invention claimed is:

1. A method comprising:
arranging for at least one satellite to provide access to an internet via one or more spatial beams of the satellite, each beam covering a respective area of a geographic region and thereby providing said internet access to a plurality of respective users in the respective area;
allocating a plurality of bandwidth pools from which bandwidth is used by the respective users in using said internet access, each bandwidth pool having a size in bandwidth available for use in said internet access; and
dynamically adapting the size of two or more of said bandwidth pools, by temporarily re-allocating currently unused bandwidth from one or more of said pools to one or more others of said pools, automatically in response to current demand for said internet access from at least one of said two or more pools;
wherein each bandwidth pool has a committed bandwidth, to or from which, in order to adapt the size, the temporarily re-allocated bandwidth can be lent to or borrowed from the one or more other pools; and
wherein traffic using said temporarily re-allocated bandwidth is marked as borrowed, and given a lower priority than traffic using the committed bandwidth.

2. The method of claim 1, wherein the satellite provides said internet access via a plurality of said spatial beams of the satellite, and said allocating and adapting comprise:
allocating from each beam a respective bandwidth pool from which bandwidth is used by the respective users in using said internet access, the bandwidth pool of each beam having a size in bandwidth available for use in said internet access; and
dynamically adapting the size of the bandwidth pools of two or more of said beams, by temporarily re-allocating bandwidth from the respective pool or pools of one or more of said beams to the respective pool or pools of one or more others of said beams, automatically in response to current demand for said internet access from at least one of said two or more beams.

3. The method of claim 1, wherein said allocating and adapting comprise:
allocating a respective bandwidth pool to each of a plurality of service types, the bandwidth pool of each service type having a size in bandwidth available for use in said internet access; and
dynamically adapting the size of the bandwidth pools of two or more of said service types, by temporarily re-allocating bandwidth from the respective pool or pools of one or more of said service types to the respective pool or pools of one or more others of said service types, automatically in response to demand for said internet access in at least one of said two or more service types.

4. The method of claim 3, wherein said service types comprise a consumer service providing internet access to consumers, and a business service providing internet access to businesses.

5. The method of claim 3, wherein said service types comprise a plurality of service grades.

6. The method of claim 1, wherein a plurality of satellites provide said internet access each via a respective one or more of said spatial beams, and wherein said allocating and adapting comprise:
allocating from each satellite a respective bandwidth pool from which bandwidth is used by the respective users in using said internet access, the bandwidth pool of each satellite having a size in bandwidth available for use in said internet access; and
dynamically adapting the size of the bandwidth pools of two or more of said satellites, by temporarily re-allocating bandwidth from the respective pool or pools of one or more of said satellites to the respective pool or pools of one or more others of said satellites, automatically in response to current demand for said internet access from at least one of said two or more satellites.

7. The method of claim 1, wherein said internet access is provided by a plurality of satellite gateways, and said allocating and adapting comprise:
allocating for each gateway a respective bandwidth pool from which bandwidth is used by the respective users in using said internet access, the bandwidth pool of each gateway having a size in bandwidth available for use in said internet access; and
dynamically adapting the size of the bandwidth pools of two or more of said gateways, by temporarily re-allocating bandwidth from the respective pool or pools of one or more of said gateways to the respective pool or pools of one or more others of said gateways, automatically in response to current demand for said internet access from at least one of said two or more gateways.

8. The method of claim 1, wherein said allocating and adapting comprise:
allocating a respective bandwidth pool to each of a plurality of internet service providers, the bandwidth pool of each internet service provider having a size in bandwidth available for use in said internet access; and
dynamically adapting the size of the bandwidth pools of two or more of said internet service providers, by temporarily re-allocating bandwidth from the respective pool or pools of one or more of said internet service providers to the respective pool or pools of one or more others of said internet service providers, automatically in response to current demand for said internet access by at least one of said two or more internet service providers.

9. The method of claim 1, wherein the borrowed traffic is not guaranteed, is first to be dropped when insufficient bandwidth is available to meet demand, and/or has a higher probability of being dropped than traffic that is not borrowed.

10. The method of claim 9, wherein said dynamic re-allocation further comprises claiming back bandwidth borrowed from the one or more of said pools to the one or more others of said pools, automatically in response to current demand for said internet access from at least one of said two or more pools.

11. The method of claim 1, wherein the nominal bandwidth of each pool is adjusted according to a number of users using the pool and an expected bandwidth per user, the dynamic adaptation being in addition to said adjustment and being based on the current demand rather than the expected bandwidth.

12. The method of claim 2, wherein the respective areas of said beams overlap.

13. The method of claim 1, wherein the bandwidth pool allocated from each beam is only a portion of a bandwidth capacity of the beam.

14. The method of claim 1, wherein each of a set of the bandwidth pools is bought by a particular internet service provider to supply the respective users.

15. The method of claim 14, further comprising sending a report on said set of bandwidth pools to the internet service provider, the report comprising information on said re-allocation.

16. The method of claim 1, comprising selecting between operating at least one of the pools in two different modes: a dynamic mode in which said dynamic adaptation of the size is enabled, and a non-dynamic mode in which said dynamic adaptation of the size is disabled.

17. Gateway equipment comprising one or more satellite transceivers for communicating with at least one satellite, and one or more routers through which at least one satellite is able to provide access to an internet; wherein said internet access is provided via one or more spatial beams of the satellite, each beam covering a respective area of a geographic region and thereby providing said internet access to a plurality of respective users in the respective area; and wherein the gateway equipment further comprises:
   a support system for allocating a plurality of bandwidth pools from which bandwidth is used by the respective users in using said internet access, each bandwidth pool having a size in bandwidth available for use in said internet access; and
   a bandwidth manager configured to dynamically adapt the size of two or more of said bandwidth pools, by temporarily re-allocating currently unused bandwidth from one or more of said pools to one or more others of said pools, automatically in response to current demand for said internet access from at least one of said two or more pools;
   wherein each bandwidth pool has a committed bandwidth, to or from which, in order to adapt the size, the temporarily re-allocated bandwidth can be lent to or borrowed from the one or more other pools; and
   wherein traffic using said temporarily re-allocated bandwidth is marked as borrowed, and given a lower priority than traffic using the committed bandwidth.

18. A system comprising:
   at least one satellite arranged to provide access to an internet via one or more spatial beams of the satellite, each beam covering a respective area of a geographic region and thereby providing said internet access to a plurality of respective users in the respective area; and
   gateway equipment arranged to communicate with the at least one satellite and with the internet, and thereby facilitating the satellite to provide said internet access;
   wherein the gateway equipment is configured to allocate a plurality of bandwidth pools from which bandwidth is used by the respective users in using said internet access, each bandwidth pool having a size in bandwidth available for use in said internet access; and
   wherein the gateway equipment is further configured to dynamically adapt the size of two or more of said bandwidth pools, by temporarily re-allocating currently unused bandwidth from one or more of said pools to one or more others of said pools, automatically in response to current demand for said internet access from at least one of said two or more pools;
   wherein each bandwidth pool has a committed bandwidth, to or from which, in order to adapt the size, the temporarily re-allocated bandwidth can be lent to or borrowed from the one or more other pools; and
   wherein traffic using said temporarily re-allocated bandwidth is marked as borrowed, and given a lower priority than traffic using the committed bandwidth.

19. A computer program product for use in a system in which at least one satellite provides access to an internet via one or more spatial beams of the satellite, each beam covering a respective area of a geographic region and thereby providing said internet access to a plurality of respective users in the respective area; wherein the computer program product comprises code embodied on a non-transitory computer-readable storage medium and configured so as when executed to perform operations of:
   allocating a plurality of bandwidth pools from which bandwidth is used by the respective users in using said internet access, each bandwidth pool having a size in bandwidth available for use in said internet access; and
   dynamically adapting the size of two or more of said bandwidth pools, by temporarily re-allocating currently unused bandwidth from one or more of said pools to one or more others of said pools, automatically in response to current demand for said internet access from at least one of said two or more pools;
   wherein each bandwidth pool has a committed bandwidth, to or from which, in order to adapt the size, the temporarily re-allocated bandwidth can be lent to or borrowed from the one or more other pools; and
   wherein traffic using said temporarily re-allocated bandwidth is marked as borrowed, and given a lower priority than traffic using the committed bandwidth.

20. The method of claim 1, wherein the satellite forms part of a satellite network having network layers, and wherein said allocating and said dynamically adapting are implemented at an internet layer of the network layers, the internet layer being above a physical layer of the network layers.

* * * * *